United States Patent [19]

Miyajima

[11] Patent Number: 5,114,657
[45] Date of Patent: May 19, 1992

[54] INTEGRALLY MOLDED CROSS-FLOW FAN AND METHOD OF MAKING THE SAME BY RADIALLY WITHDRAWING GAP-FORMING MOLDS

[75] Inventor: Yukio Miyajima, Mitsuke, Japan

[73] Assignee: Sanko Plastics Co., Ltd., Niigata, Japan

[21] Appl. No.: 495,189

[22] Filed: Mar. 19, 1990

[30] Foreign Application Priority Data

Mar. 20, 1989 [JP] Japan ............... 1-68951
Dec. 6, 1989 [JP] Japan ............ 1-141220[U]
Dec. 6, 1989 [JP] Japan ............... 1-317360

[51] Int. Cl.$^5$ ........................... B29C 39/00
[52] U.S. Cl. ................... 264/334; 249/145; 249/176; 249/184; 264/318; 425/DIG. 5; 425/441; 425/577
[58] Field of Search ............ 264/334, 318; 425/441, 425/DIG. 5, 180; 249/142, 145, 176, 184

[56] References Cited

U.S. PATENT DOCUMENTS

| | | | |
|---|---|---|---|
| 3,189,671 | 6/1965 | Babb | 264/334 |
| 3,787,155 | 1/1974 | Zangl | 425/DIG. 5 |
| 4,306,851 | 12/1981 | Thune | 425/468 |
| 4,362,687 | 12/1982 | Olschewski et al. | 264/318 |

FOREIGN PATENT DOCUMENTS 1117911 7/1970 United Kingdom .

*Primary Examiner*—David A. Simmons
*Assistant Examiner*—Merrick Dixon
*Attorney, Agent, or Firm*—Sughrue, Mion, Zinn, Macpeak & Seas

[57] ABSTRACT

An integrally molded cross-flow fan has a circular array of angularly spaced, radial vanes. The cross-flow fan is molded with a molding assembly having a plurality of gap-forming molds jointly defining mold cavities for forming the vanes. A molten resin material is supplied into the mold cavities to mold the cross-flow fan. Thereafter, a first group of gap-forming molds are withdrawn radially outwardly from between the molded vanes, and after elapse of a period of time, a second group of gap-forming molds, which alternate with the gap-forming molds of the first group, are withdrawn radially outwardly from between the molded vanes. The gap-forming molds of the first group are simultaneously withdrawn radially outwardly, and after elapse of the period of time, the gap-forming molds of the second group are simultaneously withdrawn radially outwardly. Since the gap-forming molds of the first and second groups are not simultaneously withdrawn altogether, but withdrawn one after another, with a certain time lag, they can be smoothly separated from the molded vanes, and the molded vanes are prevented from being dragged or damaged by the gap-forming molds.

2 Claims, 14 Drawing Sheets

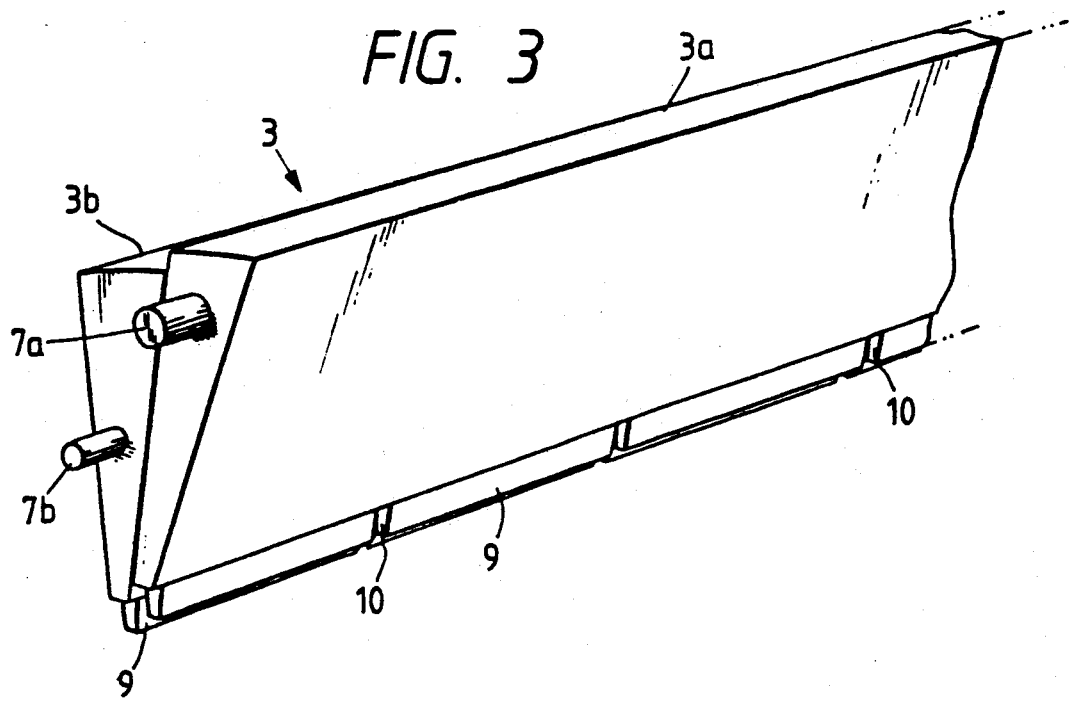
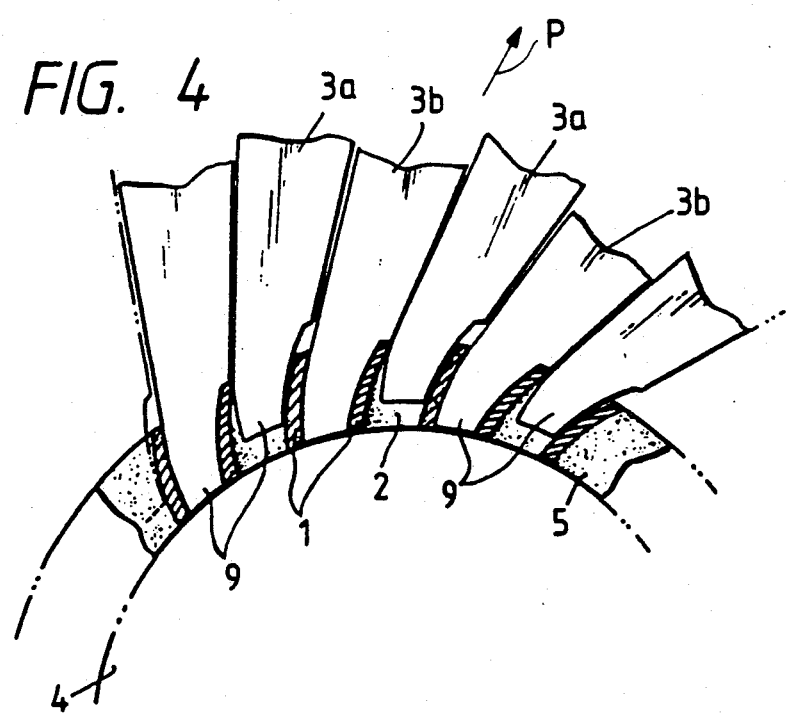

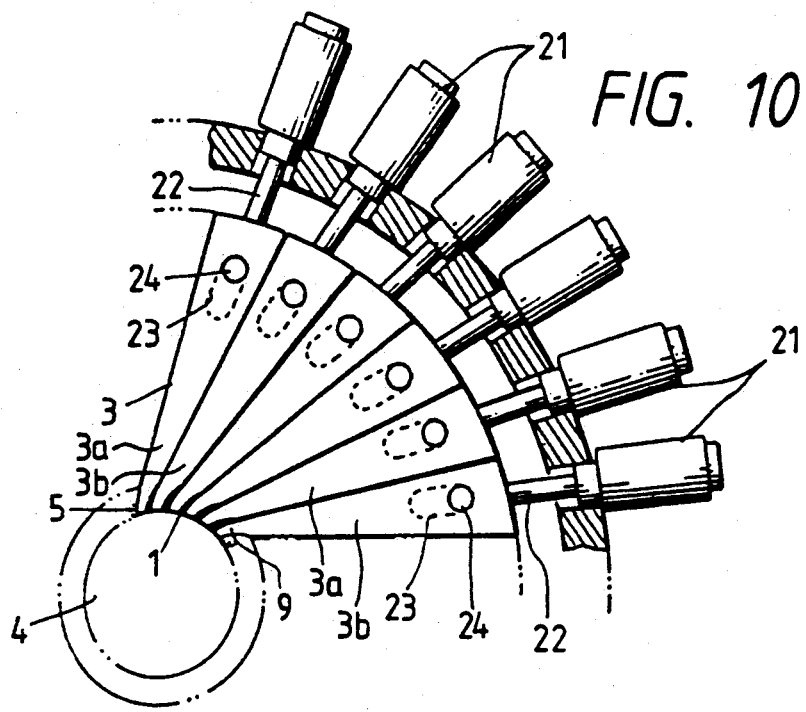
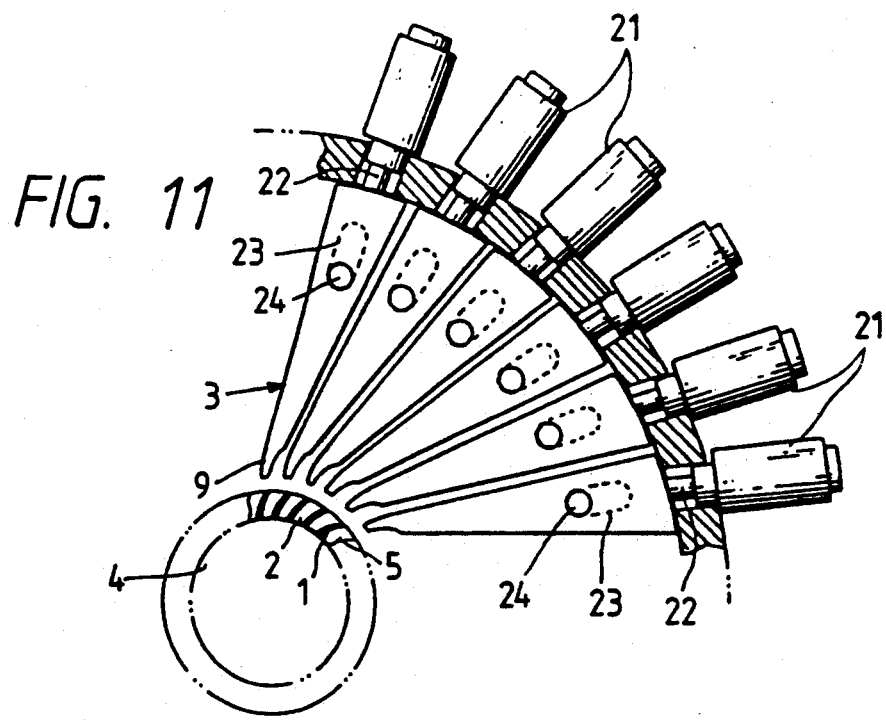

INTEGRALLY MOLDED CROSS-FLOW FAN AND METHOD OF MAKING THE SAME BY RADIALLY WITHDRAWING GAP-FORMING MOLDS

BACKGROUND OF THE INVENTION

The present invention relates to an integrally molded cross-flow fan having a number of equally angularly spaced, radial thin vanes, for use in an air-conditioning unit, an air blower, or the like, and a method of integrally molding such a cross-flow fan.

One conventional elongate cross-flow fan molded of plastics comprises a plurality of annular ribs spaced at regular intervals and a plurality of equally angularly spaced, radial thin vanes extending axially between each pair of the annular ribs.

Heretofore, the conventional cross-flow fan is molded of plastics as follows: A cross-flow fan segment comprising an annular rib and a plurality of equally angularly spaced, radial thin vanes is integrally molded of plastics. After the cross-flow fan segment has been molded, the mold by which the spaced vanes are formed are axially withdrawn from the cross-flow fan segment. In this manner, a plurality of integrally molded cross-flow fan segments are fabricated. Then, the cross-flow fan segments are bonded together at the ribs, thereby making up an elongate cross-flow fan.

The above manufacturing process is however tedious, time-consuming, and does not lend itself to mass-production. Accordingly, the conventional cross-flow fan is expensive to manufacture.

Since the entire cross-flow fan is composed of bonded cross-flow fan segments, it has a low degree of roundness or poor weight balance, and hence may cause vibration or noise during operation. To avoid this problem, an unbalanced cross-flow fan must be balanced by a balancing weight attached thereto. Such a balancing adjustment process adds to the cost of the cross-flow fan.

SUMMARY OF THE INVENTION

It is an object of the present invention to provide an integrally molded cross-flow fan and a method of making such an integrally molded cross-flow fan.

According to the present invention, there is provided a method of molding a cross-flow fan having a circular array of angularly spaced, radial vanes with a molding assembly having a plurality of gap-forming molds jointly defining mold cavities for forming the vanes. With the molding method, a molding material is supplied into the mold cavities to mold the cross-flow fan. Thereafter, a first group of gap-forming molds are withdrawn radially outwardly from between the molded vanes, and after elapse of a period of time, a second group of gap-forming molds, which alternate with the gap-forming molds of the first group, are withdrawn radially outwardly from between the molded vanes. The gap-forming molds of the first group are simultaneously withdrawn radially outwardly, and after elapse of the period of time, the gap-forming molds of the second group are simultaneously withdrawn radially outwardly.

Since the gap-forming molds of the first and second groups are not simultaneously withdrawn altogether, but withdrawn one after another, with a certain time lag, they can be smoothly separated from the molded vanes and the molded vanes are prevented from being dragged or damaged by the gap-forming molds.

The molding apparatus includes a cam disc having first guide grooves and second guide grooves, the gap-forming molds of the first group having pins slidably received in the first grooves, respectively, the gap-forming molds of the second group having pins slidably received in the second groups, respectively, the first and second guide groove being shaped such that the gap-forming molds of the first group are withdrawn radially outwardly and, after elapse of the period of time, the gap-forming molds of the second group are withdrawn radially outwardly in response to rotation of the cam disc. The first guide grooves are arcuately shaped gradually away from the central axis of the cam disc, and the second guide grooves include arcuate portions concentric with the central axis of the cam disc and portions bent from the concentric arcuate portions away from the central axis of the cam disc.

According to another aspect of the invention, the molding apparatus includes a plurality of fluid cylinders coupled respectively to the gap-forming molds of the first and second groups, and wherein the fluid cylinders are controllable such that the gap-forming molds of the first group are withdrawn radially outwardly and, after elapse of the period of time, the gap-forming molds of the second group are withdrawn radially outwardly.

According to still another aspect of the invention, the molding apparatus includes a plurality of arcuate members radially movably disposed around the gap-forming molds of the first and second groups, the arcuate member having shorter and longer slots, the gap-forming molds of the first group having shorter headed pins extending radially outwardly and closely fitted in the shorter slots, the gap-forming molds of the second group having longer headed pins extending radially outwardly and loosely fitted in the longer slots, and means for radially outwardly displacing the arcuate members to cause the shorter and longer headed pins to move the gap-forming molds such that the gap-forming molds of the first group are withdrawn radially outwardly and, after elapse of the period of time, the gap-forming molds of the second group are withdrawn radially outwardly in response to rotation of the cam disc.

An integrally molded cross-flow fan according to the present invention comprises a circular array of angularly spaced, radial vanes. Each of the vanes has a face and a back which meet the following conditions:

The face of a vane and the back of an adjacent vane which confronts the face are flat surfaces or curved surfaces which are curved in one direction and which have an arcuate surface.

A direction tangential to the face of a vane at any point which is located radially outwardly of a boundary surface between gap-forming molds disposed between the vanes and a core disposed within the circular array of vanes, is parallel to, or spread, in a radially outward direction, away from a direction tangential to a path along which the gap-forming molds are withdrawn radially outwardly, at a corresponding point thereon which is at same distance from the center of the core as the first-mentioned point.

A direction tangential to the back of an adjacent vane at any point which is located radially outwardly of the boundary surface between the gap-forming molds and the core, is parallel to, or spread, in the radially outward direction, away from a direction tangential to the path along which the gap-forming molds are withdrawn radially outwardly, at a corresponding point thereon which is at same distance from the center of the core as the first-mentioned point.

With the integrally molded cross-flow fan thus constructed, the gap-forming molds can easily be separated from the vanes.

The cross-flow fan of the invention can easily be integrally molded, can be mass-produced automatically, and hence is inexpensive to manufacture. The integrally molded cross-flow fan is well balanced, and free from vibration and noise in operation.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a fragmentary perspective view of a gap-forming mold;

FIG. 4 is an enlarged fragmentary view showing the manner in which every other gap-forming mold is withdrawn;

FIGS. 10 and 11 are enlarged fragmentary views showing a molding apparatus according to a second embodiment, for carrying out the molding method of the present invention;

DETAILED DESCRIPTION

Figure 1:
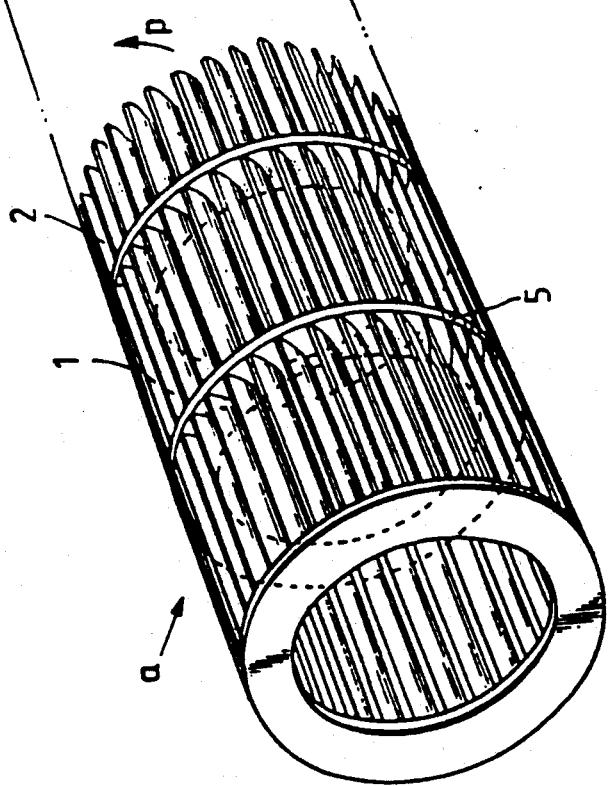
FIG. 1 is a perspective view of a fragmentary perspective view of an integrally molded cross-flow fan according to the present invention.
Figure 2:
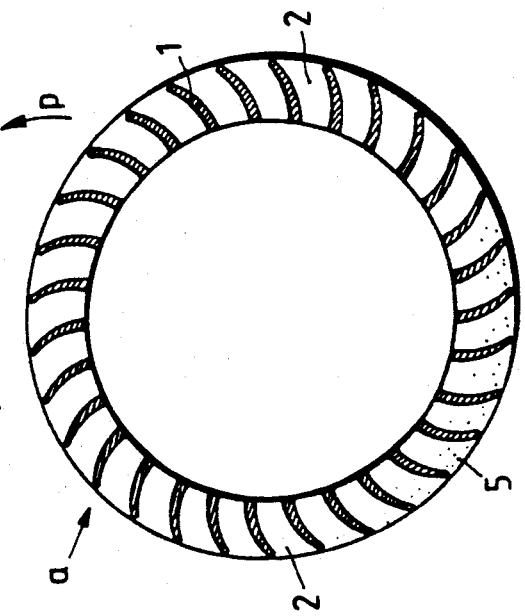
FIG. 2 is an enlarged transverse cross-sectional view of the cross-flow fan shown in FIG. 1.

FIGS. 1 and 2 show an integrally molded elongate cross-flow fan a according to the present invention. The cross-flow fan a which is molded of plastics as an integral unitary structure comprises a plurality of annular ribs 5 spaced at regular intervals and a plurality of equally angularly spaced, radial thin vanes 1 extending axially between each pair of the annular ribs 5. The vanes 1 are radially spaced by spaces or gaps 2.

As shown in FIGS. 3 and 4, the vanes 1 are molded by a circular array of elongate gap-forming molds 3 which extend radially. The gap-forming molds 3 are divided into two groups, one composed of gap-forming molds 3a and the other of gap-forming molds 3b which alternate with the gap-forming molds 3a. As shown in FIG. 3, the gap-forming molds 3a, 3b are of a substantially wedge-shaped cross section and have, on radially inner tip ends, teeth 9 which jointly define mold cavities for forming the vanes 1 (FIG. 4). Each of the teeth 9 has a plurality of equally spaced rib recesses 10 (FIG. 3) for forming the ribs 5.

The gap-forming molds 3a, 3b have pins 7a, 7b, respectively, on their longitudinally opposite ends. As shown in FIGS. 5 through 9, the pins 7a, 7b have inner ends which are slidably received in cylindrical holes defined in the ends of the gap-forming molds 3a, 3b. The outer ends of the pins 7a, 7b are slidably received in respective guide grooves 8a, 8b defined in a pair of axially spaced, coaxial cam discs 6 disposed near the longitudinal ends of the gap-forming molds 3a, 3b and also in respective guide grooves 12a, 12b defined in guide plates 11 disposed adjacent to the cam discs 6 remotely from the gap-forming molds 3a, 3b.

Figure 5:
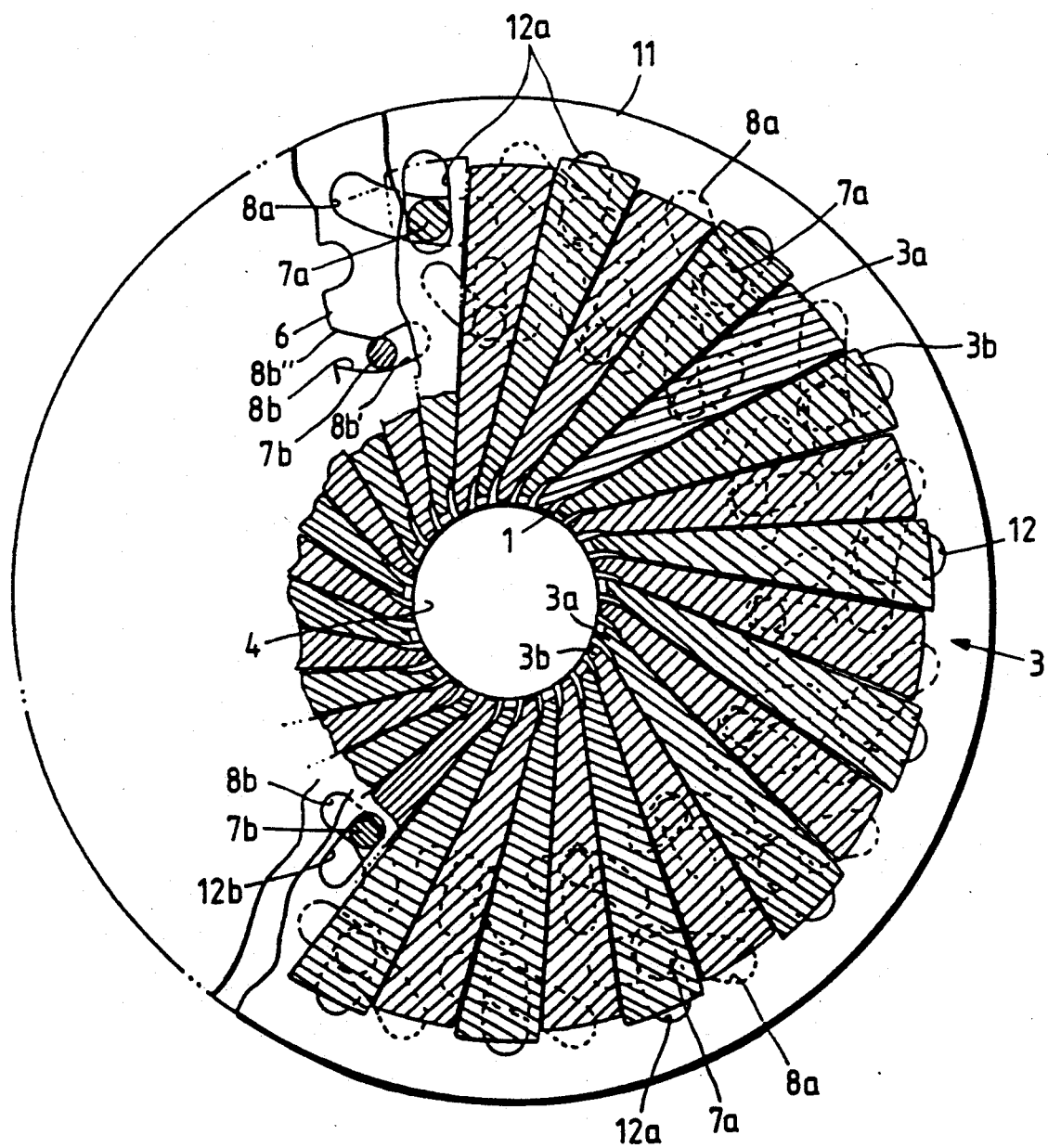
FIGS. 5 and 6 are fragmentary transverse cross-sectional views showing the manner in which a mold assembly is withdrawn.
Figure 6:
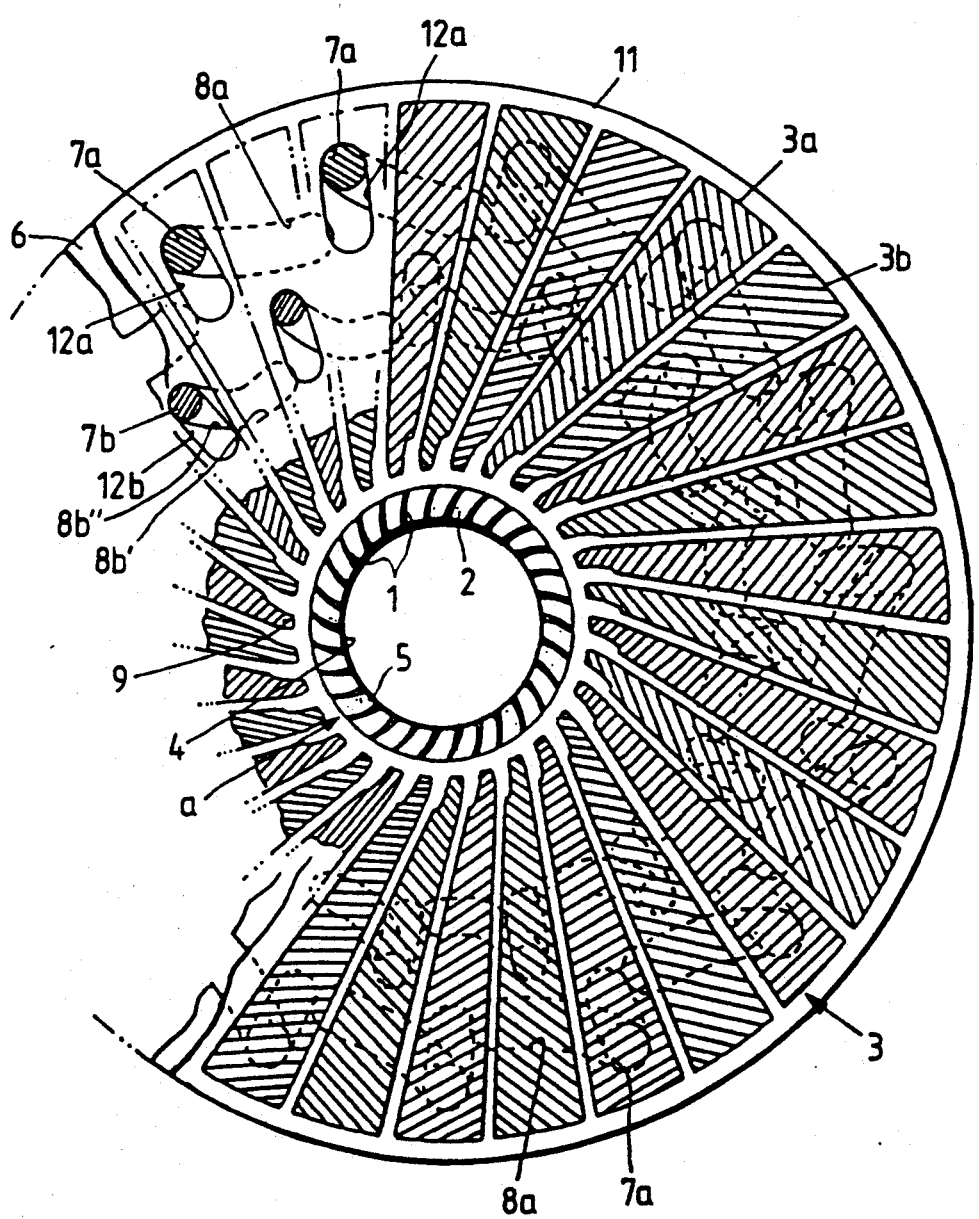

As illustrated in FIGS. 5 and 6, those guide grooves 8a which receive the pins 7a on the gap-forming molds 3a are of an oblong elliptical shape which is smoothly curved gradually away from the central axis of the cam discs 6 so that the gap-forming molds 3a will move radially outwardly gradually in response to rotation of the cam discs 6. Those guide grooves 8b which receive the pins 7b on the gap-forming molds 3b are positioned radially inwardly of the guide grooves 8a, and are of an oblong elliptical shape kwhich includes a concentric acurate portion 8b' equidistant from, or concentric with, the central axis of the cam discs 6 and which also includes a sharply bent portion 8b'' curved away from the central axis of the cam discs 6. The guide grooves 12a, 12b in the guide plates 11 receive the pins 7a, 7b, respectively, and are of a straight oblong elliptical shape which extends radially so that they will guide radial movement of the gap-forming molds 3a, 3b as they are guided by the guide grooves 8a, 8b.

Figure 7:
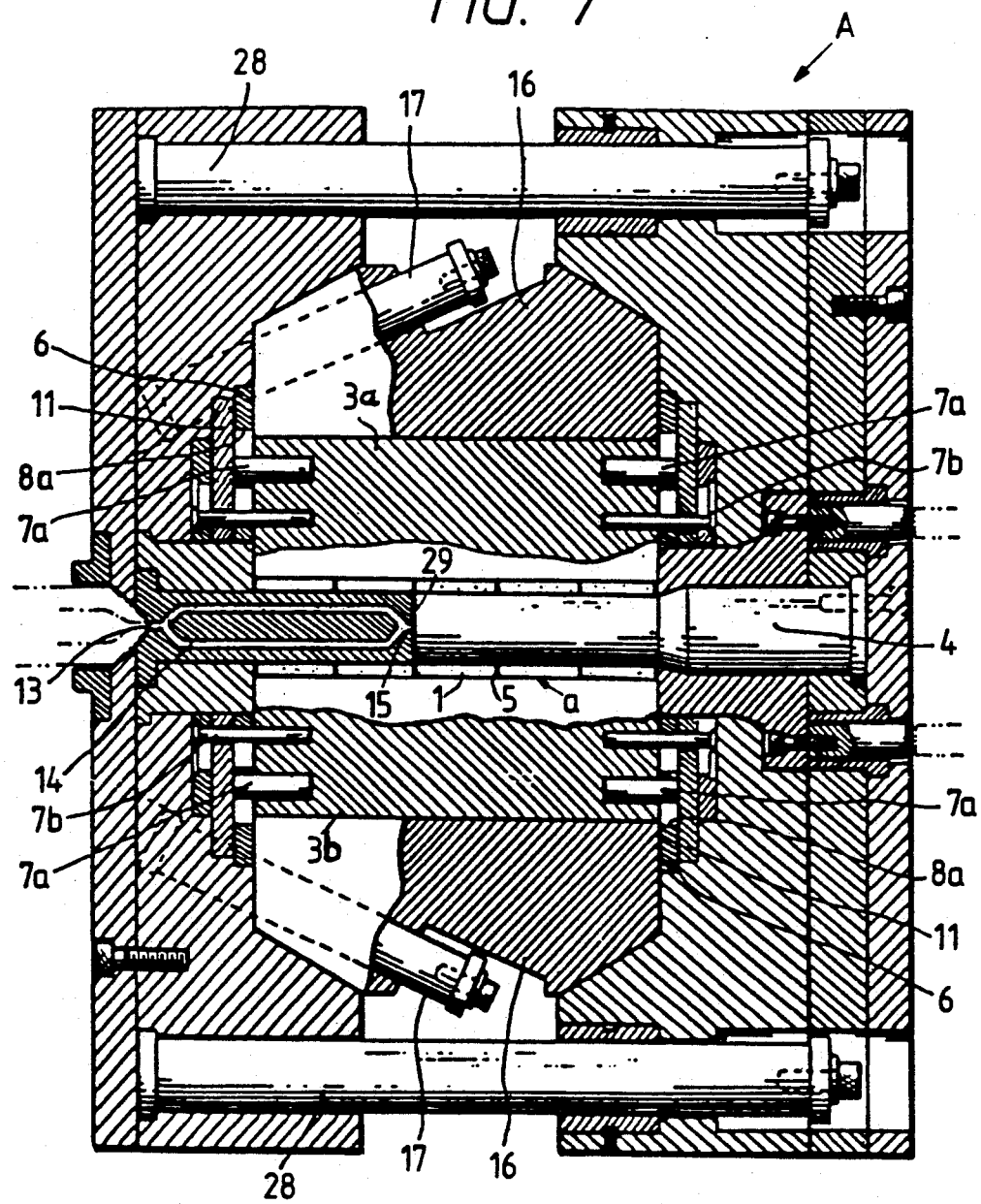
FIG. 7 is a cross-sectional view of a molding apparatus according to a first embodiment, for carrying out a molding method of the present invention.
Figure 8:
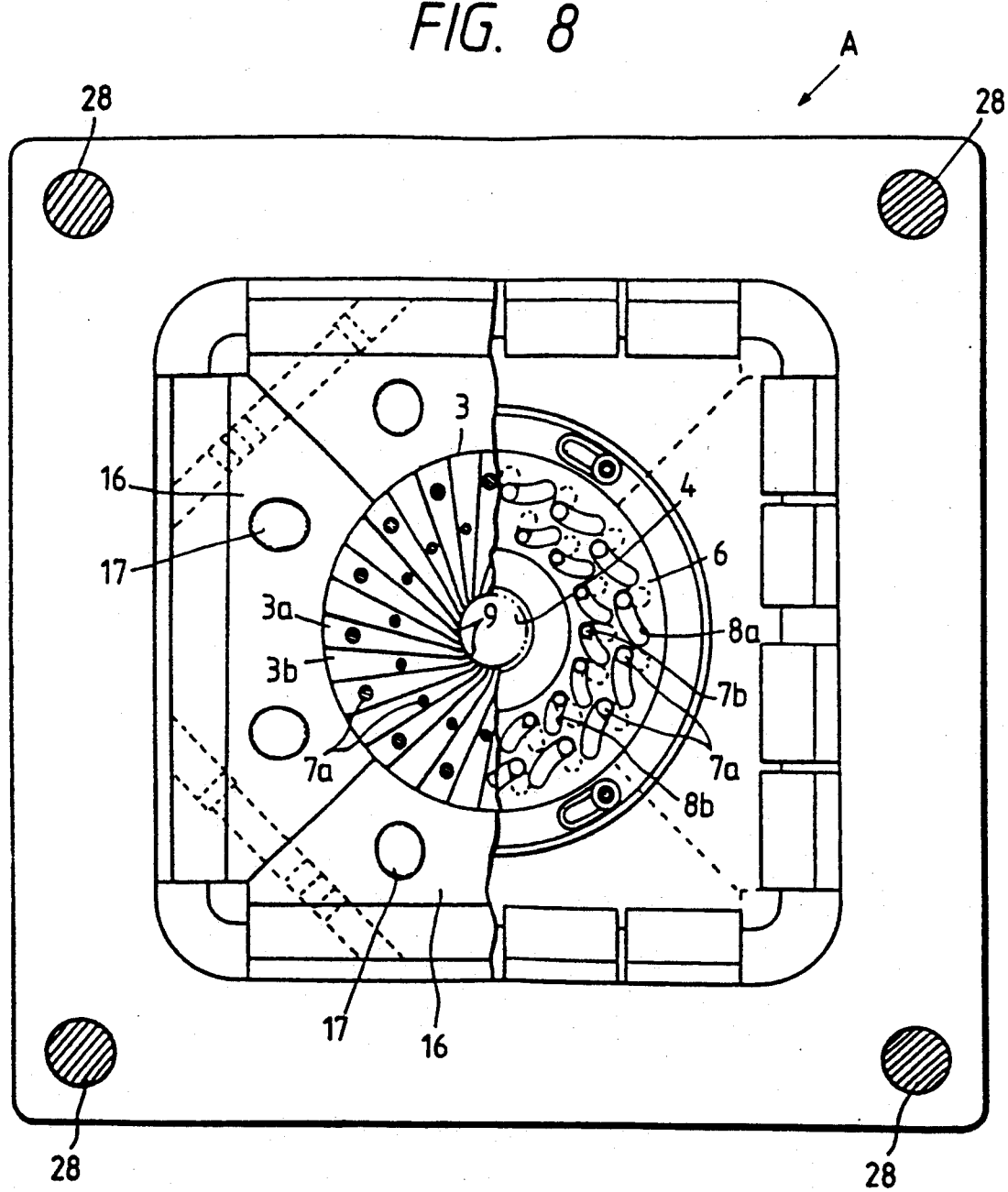
FIG. 8 is a side elevational view, partly broken away, of the molding apparatus shown in FIG. 7.
Figure 9:
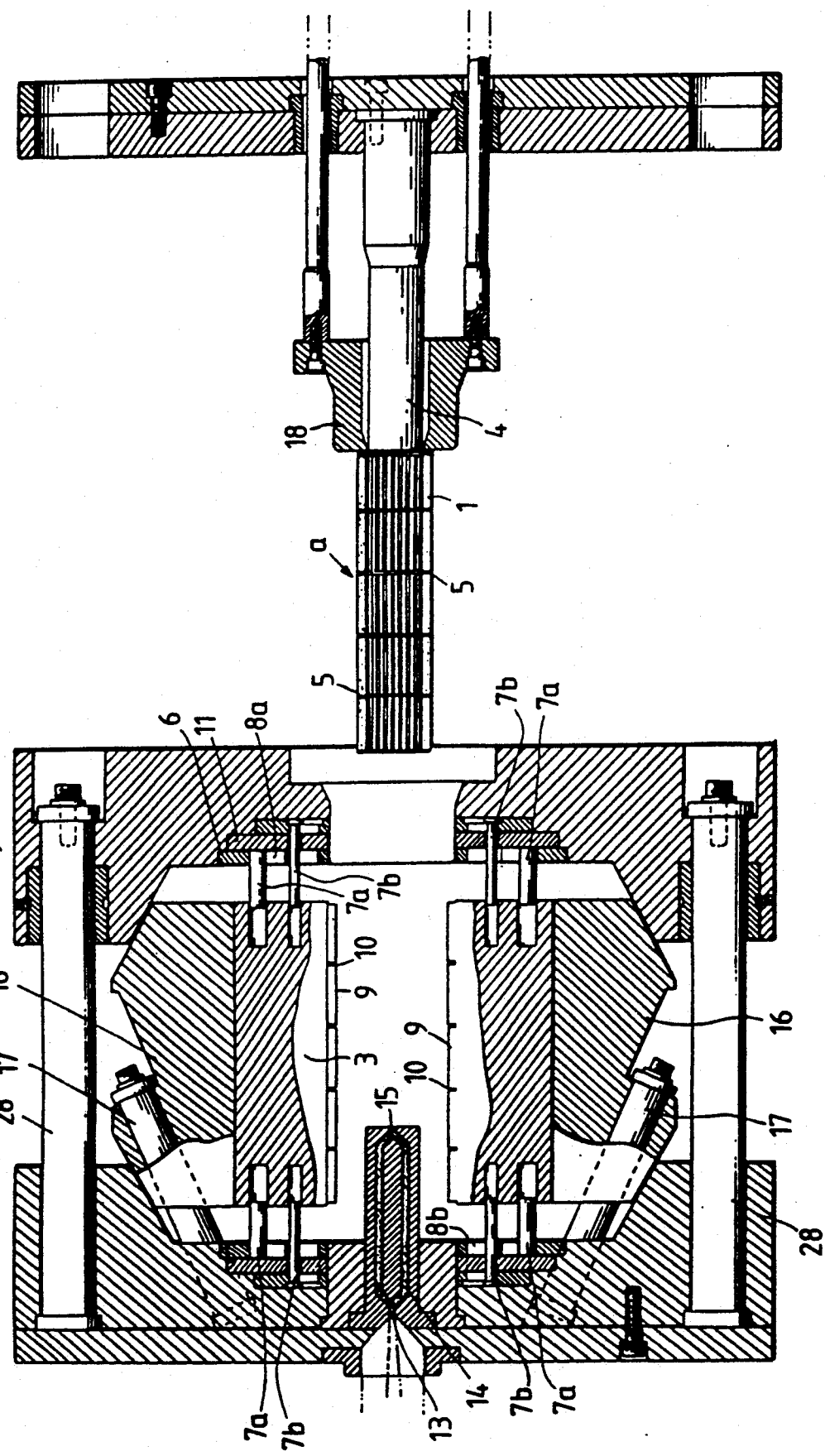
FIG. 9 is cross-sectional view of the molding apparatus shown in FIG. 7, with gap-forming molds withdrawn and a core removed.

FIGS. 7 through 9 show a molding apparatus A which incorporates the gap-forming molds 3a, 3b, the cam discs 6, and the guide plates 11.

The molding apparatus A operates as follows:

As shown in FIG. 7, the molding apparatus A is in a closed position during a molding process. A molten resin material is injected from an injection cylinder nozzle 13 through a hot runner 14 in a central core 4, a sprue 15, and a circular gate 29 into the molding cavities defined between the teeth 9 of the gap-forming molds 3a, 3b.

After a cross-flow fan a is integrally molded, the righthand member (FIG. 7) of the molding apparatus A is moved to the right along slide pins 28, so that the molding apparatus A is split open. As the molding apparatus A is thus opened, four slide plates 16 which have pressed the gap-forming molds 3a, 3b radially inwardly are displaced radially outwardly along angular pins 17 over which the slide plates 16 are slidably fitted. The gap-forming molds 3a, 3b are therefore released and can now freely move radially outwardly.

Then, the cam discs 6 are rotated about their own axis by either a motor which rotates gears meshing with gear teeth on the cam discs 6 or rods of hydraulic cylinders associated with the cam discs 6. When the cam discs 6 are rotated counterclockwise (FIG. 5) through a small angle, the gap-forming molds 3a are simultaneously moved radially outwardly away from the central axis of the cam discs 6 by the guide grooves 8a so that the gap-forming molds 3a are first withdrawn from the spaces or gaps 2 between the vanes 1. At this time, the gap-forming molds 3b are not yet withdrawn from the gaps 2 since the pins 7b thereof still move in the concentric arcuate portions 8b' of the guide grooves 8b, as shown in FIG. 5.

Continued rotation of the cam discs 6 causes the gap-forming molds 3a to move radially outwardly continuously away from the gaps 2, and also causes the gap-forming molds 3b to be also moved radially outwardly away from the gaps 2 because the pins 7b of the gap-forming molds 3b slide from the arcuate portions 8b' into the sharply bent portions 8b" of the guide grooves 8b. Therefore, the gap-forming molds 3b are displaced out of the gaps 2 at a later time than the gap-forming molds 3a.

The guide grooves 8a, 8b which receive the pins 7 of the gap-forming molds 3a, 3b have the same radial extent and the same angular extent, whereby the gap-forming molds 3a, 3b are equally spaced from the vanes 1 when the cam discs 6 are fully rotated as shown in FIG. 6.

The guide grooves 8a may be shaped in symmetric relation to the guide grooves 8b so that the guide grooves 8a include sharply bent portions, like the portions 8b', at their ends which receive the pins 7a when the cam discs 6 are fully rotated. With this arrangement, the gap-forming molds 3a, 3b are separated from the vanes 1 in completely alternate strokes.

After the gap-forming molds 3a, 3b have been completely separated from the vanes 1, the core 4 with the molded cross-flow fan a attached thereto is pulled out to the right as shown in FIG. 9. Thereafter, a stripper plate 18 is pushed to the left along the circumferential surface of the core 4 to remove the cross-flow fan a from the core 4.

The above mold splitting process is reversed to close the molding apparatus A as shown in FIG. 7. Then, a molten resin material is injected again from the injection cylinder nozzle 13 to mold another cross-flow fan.

According to a molding method of the present invention, therefore, when the gap-forming molds 3a, 3b are to be withdrawn radially outwardly from the gaps 2 between the vanes 1, the gap-forming molds 3a, 3b are moved radially outwardly altogether. Instead, the gap-forming molds 3a are first simultaneously withdrawn through the coaction of the pins 7a and the guide grooves 8a, 12a upon rotation of the cam discs 6. Then, with a certain time lag, the gap-forming molds 3b are simultaneously withdrawn through the coaction of the pins 7b and the guide grooves 8b, 12b upon further rotation of the cam discs 6.

When the gap-forming molds 3a are first withdrawn, they can be smoothly removed from the vanes 1 since the vanes 1 are supported by the other gap-forming molds 3a which remain in contact with the vanes 1. When the gap-forming molds 3b are then withdrawn, they can also be smoothly removed from the vanes 1 as one side of the vanes 1 has already been freed from the gap-forming molds 3a that have previously been withdrawn radially outwardly. The vanes 1 are therefore prevented from dragged radially outwardly or damaged by the gap-forming molds 3a, 3b since the gap-forming molds 3a, 3b, can be smoothly withdrawn radially outwardly in the direction indicated by the arrow p (FIGS. 1, 2, and 4).

With the molding method of the invention, it is possible to integrally mold the cross-flow fan a with ease. Moreover, the cross-flow fan a can be integrally molded highly efficiently, and can be mass-produced automatically. The integrally molded cross-flow fan a is well balanced and substantially free of vibration and noise during operation.

Figure 12:
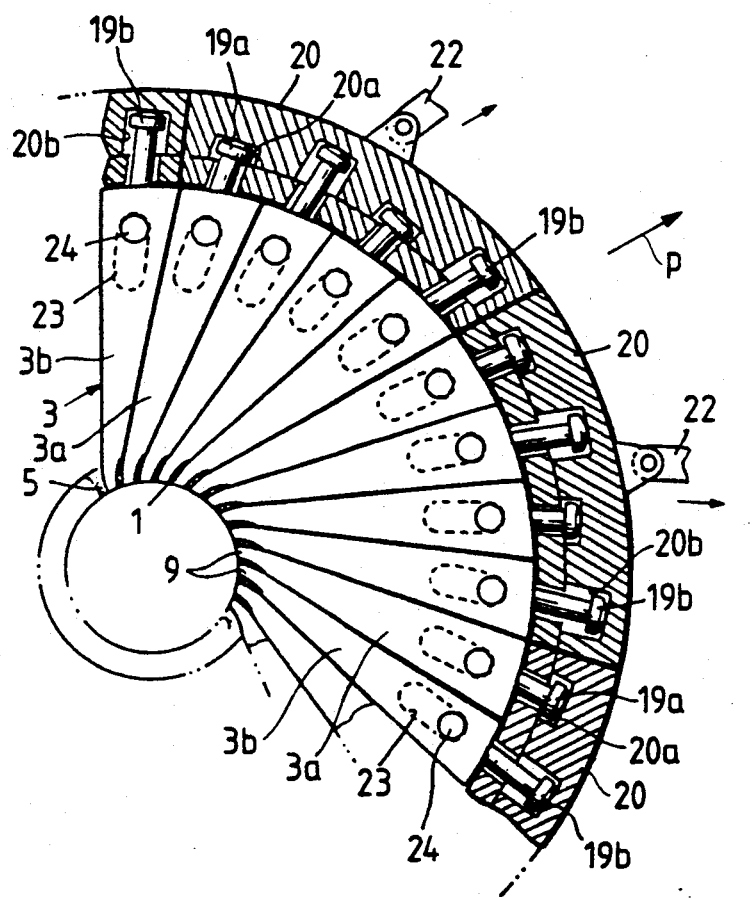
FIG. 12 is an enlarged fragmentary view of a molding apparatus according to a modification of the second embodiment.

FIGS. 10 through 12 show a molding apparatus according to a second embodiment, for carrying out the molding method of the present invention. According to the second embodiment, no cam discs are employed, but hydraulic cylinders are employed to move gap-forming molds radially outwardly.

As shown in FIGS. 10 and 11, a plurality of radial gap-forming molds 3 are directly coupled at their radially outer sides to the rods 22 of respective hydraulic cylinders 21. The hydraulic cylinders 21 are controlled in operation to move the gap-forming molds 3 radially. Preferably, the gap-forming molds 3 are divided into two groups of alternately arranged gap-forming molds 3a, 3b, and the hydraulic cylinders are controlled such that the gap-forming molds 3a of one group are first withdrawn radially outwardly, and then the gap-forming molds 3b of the other group are withdrawn with a certain time lag. The gap-forming molds 3a, 3b have pins 24 which are received in respective guide grooves 23 for guiding the radial movement of the gap-forming molds 3.

FIG. 12 shows a modified molding apparatus which employs a reduced number of hydraulic cylinders and which is arranged for reliable control of withdrawal of the gap-forming molds 3 of one group and delayed withdrawal of the gap-forming molds 3 of the other group.

As shown in FIG. 12, shorter and longer headed pins 19a, 19b are coupled to the radially outer sides of the alternately arranged gap-forming molds 3a, 3b. The headed pins 19a, 19b are received in a plurality of arcuate members 20 disposed radially outwardly of the gap-forming molds 3a, 3b. More specifically, each of the arcuate members 20 has shorter and longer headed pins 19a, 19b are received. The shorter headed pins 19a are closely fitted in the shorter slots 20a, but the longer headed pins 19b are loosely fitted in the longer slots 20b so that the longer headed pins 19b are movable radially in the longer slots 20b by a distance corresponding to the difference in length between the shorter and longer headed pins 19a, 19b. The arcuate members 20 are operatively coupled to the rods 22 of hydraulic cylinders (not shown).

In operation, when the arcuate members 20 are displaced radially outwardly in the direction indicated by the arrow p, the gap-forming molds 3a with the shorter headed pins 19a fitted in the slots 20a immediately start being withdrawn radially outwardly from the gaps 2 between the vanes 1. Then, after the gap-forming molds 3a have been withdrawn by the distance corresponding to the difference in length between the headed pins 19a, 19b, the gap-forming molds 3b start being withdrawn radially outwardly upon continued radially outward displacement of the arcuate members 20. Therefore, the gap-forming molds 3a, 3b are withdrawn one after another with a certain time lag.

Figure 13:
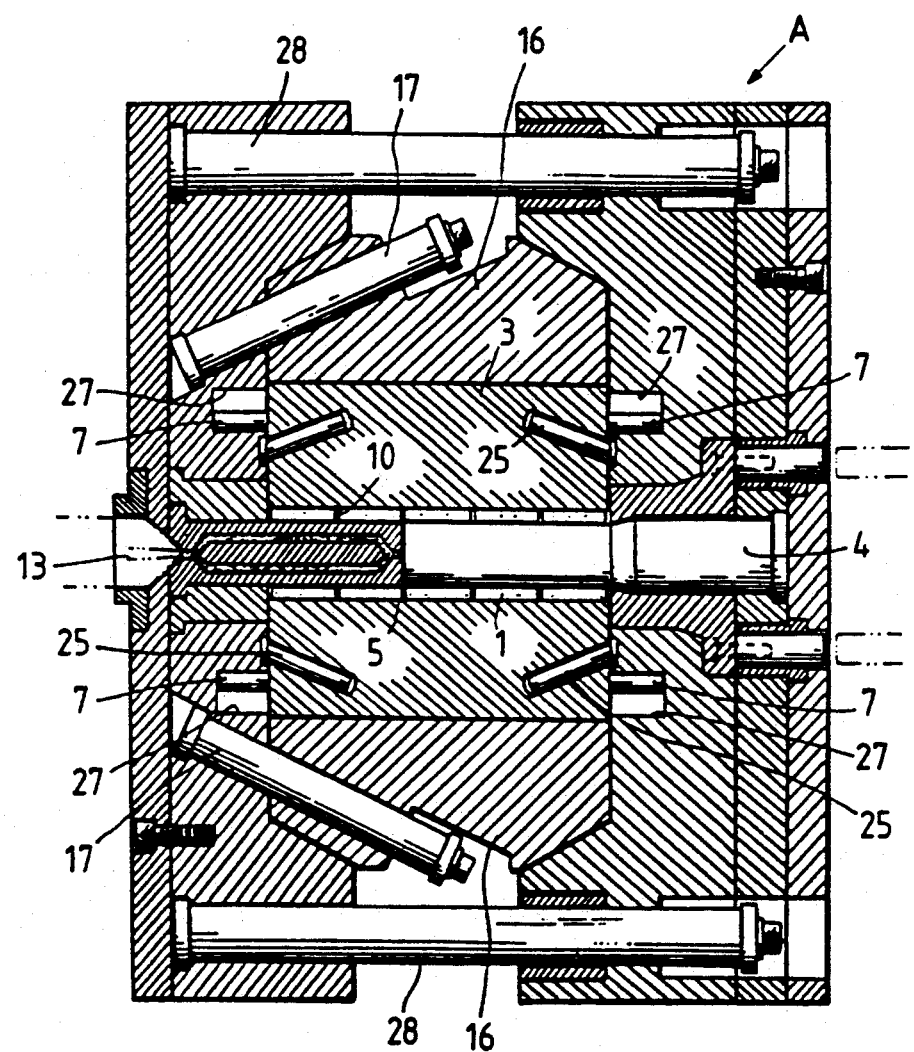
FIGS. 13 and 14 are cross-sectional views of a molding apparatus according to a third embodiment, for carrying out the molding method of the present invention.
Figure 14:
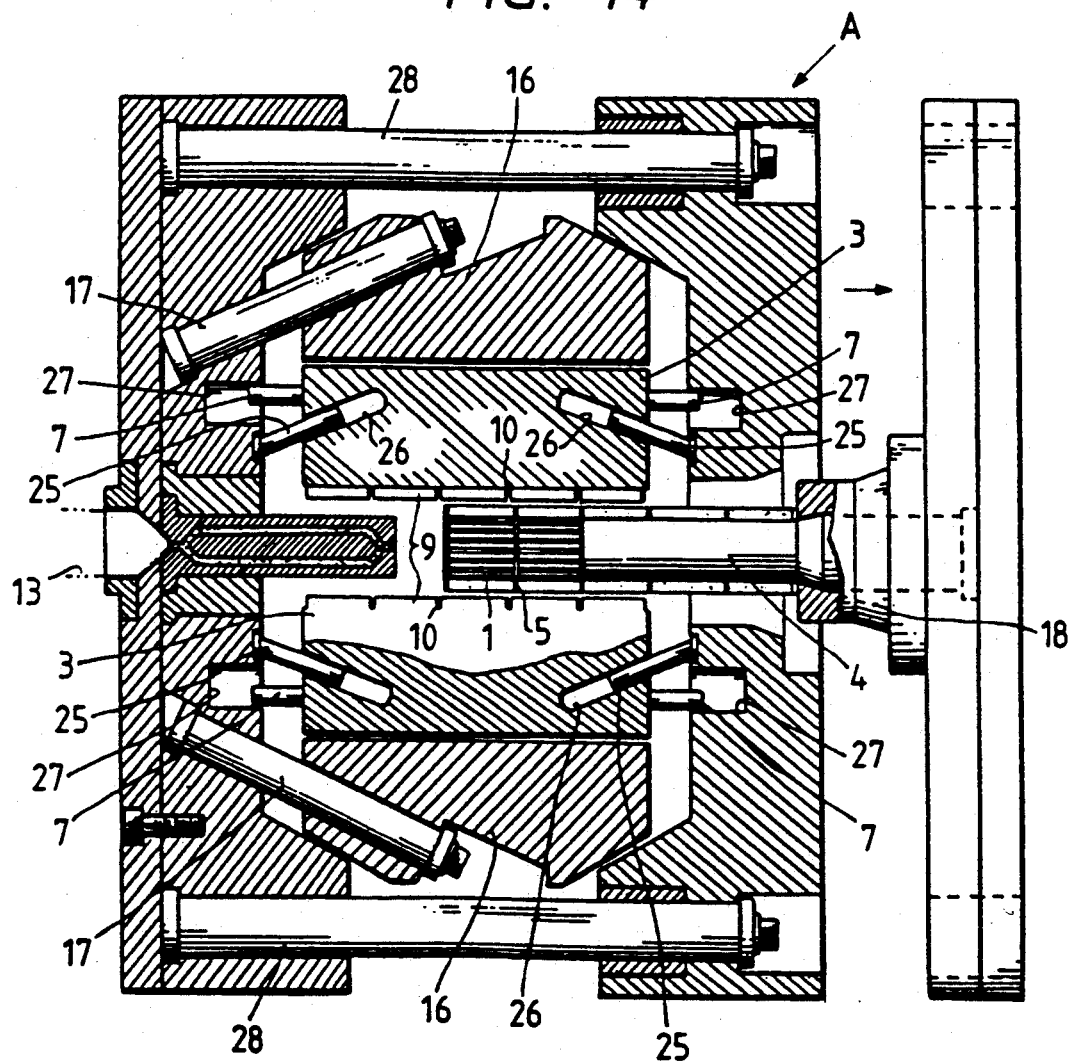

FIGS. 13 and 14 shows a molding apparatus according to a third embodiment, for carrying out the molding method of the present invention. According to the third embodiment, gap-forming molds 3 are withdrawn radially outwardly by angular pins 25 when the molding apparatus A is split open. More specifically, the gap-forming molds 3 have respective slots 26 defined in their longitudinally opposite ends and inclined with respect to the direction in which the molding apparatus A is split open. The slots 26 have a circular cross section. The angular pins 25 which are fixed at one end to lefthand and righthand members of the molding apparatus A are slidably fitted in the slots 26. Pins 7 on the ends of the gap-forming molds 3 are slidably received in guide grooves 27 defined in the lefthand and righthand members of the molding apparatus A. When the righthand member of the molding apparatus A is displaced to the right, the gap-forming molds 3 are also slid to the right and, at the same time, are withdrawn radially outwardly away from the vanes 1 along the angular pins 25, as shown in FIG. 14.

The slots 26 defined in the gap-forming molds 3 may be of an elliptical cross section so that the angular pins 25 are loosely received in the slots 26. With such a modification, the gap-forming molds 3 start to be withdrawn radially outwardly from the vanes 1 with a time lag which corresponds to the play that the gap-forming molds 3 have in the slots 26.

Figure 15:
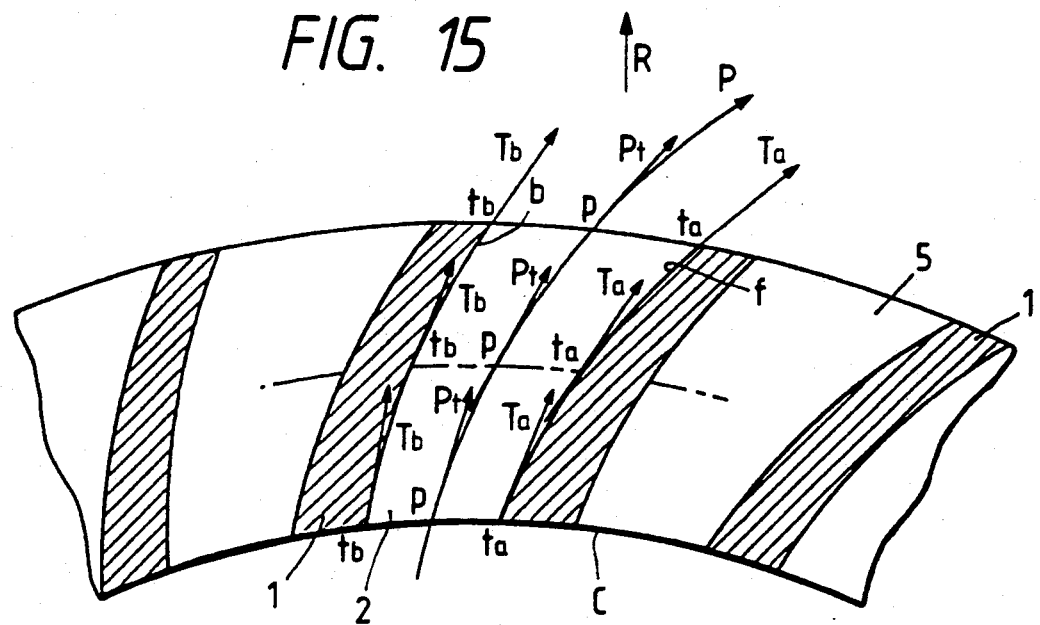
FIG. 15 is an enlarged fragmentary cross-sectional view of cross-flow fan vanes which meet the conditions according to the present invention.

FIG. 15 shows vanes of an integrally molded cross-flow fan according an embodiment of the present invention.

In FIG. 15, a vane 1 has a face f and an adjacent vane 1 has a back b which confronts the face f. The face f and the back b are flat surfaces or curved surfaces which are curved in one direction, i.e., to the right, and which have an arcuate surface (Condition I).

Now, comparison will be made between the face f of a vane 1 and a path P along which the gap-forming molds 3 are withdrawn in the radially outward direction indicated by the arrow R.

A direction Ta tangential to the face f of a vane 1 at any point ta which is located radially outwardly of a boundary surface C (the inner peripheral edge of the rib 5) between the gap-forming molds 3 and the core 4, i.e. any point ta on the face f of the vane 1, is parallel to, or spread, in the radially outward direction R, away from a direction Pt tangential to the path P at a corresponding point p thereon which is at same distance from the center of the core 4 as the point ta (Condition II). FIG. 15 specifically shows that the tangential directions Ta at three points, i.e., inner, intermediate, and outer ends, on the face f are spread, in the radially outward direction R, away from the tangential directions Pt at corresponding three points p on the path p.

Next, comparison will be made between the back b of an adjacent vane 1 and the path P along which the gap-forming molds 3 are withdrawn in the radially outward direction indicated by the arrow R.

A direction Tb tangential to the back b of a vane 1 at any point tb which is located radially outwardly of the boundary surface C, i.e., any point tb on the back b of the vane 1, is parallel to, or spread, in the radially outward direction R, away from the direction Pt tangential to the path P at the corresponding point p thereon which is at same distance from the center of the core 4 as the point tb (Condition III) FIG. 15 specifically shows that the tangential directions Tb at three points, i.e., inner, intermediate, and outer ends, on the back b are spread, in the radially outward direction R, away from the tangential directions Pt at corresponding three points p on the path P.

Figure 16:
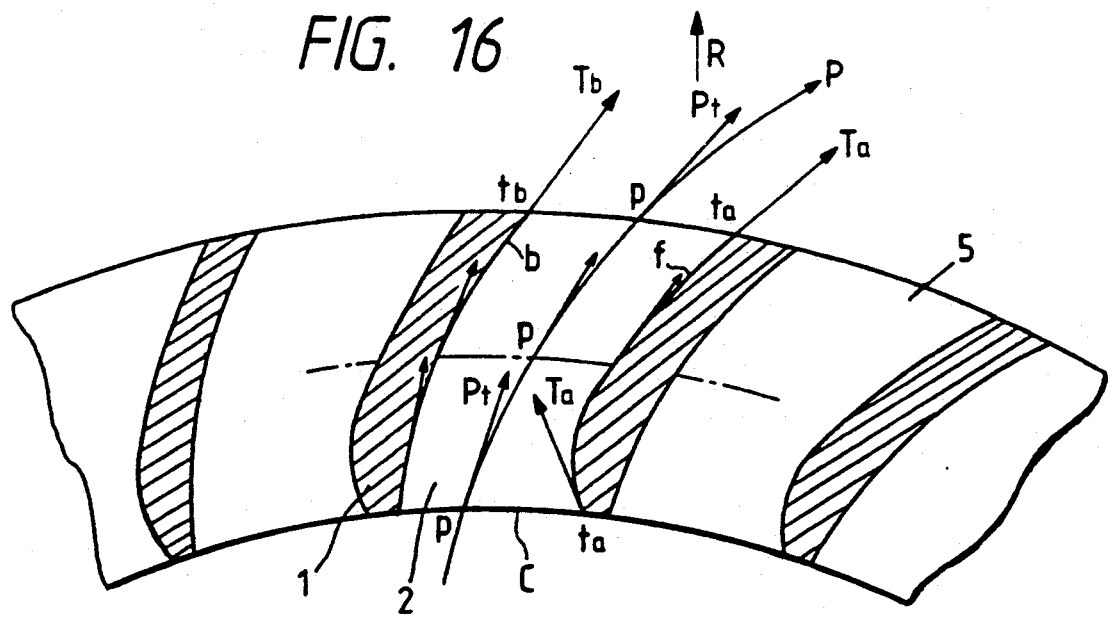
FIGS. 16 and 17 are enlarged fragmentary cross-sectional views of cross-flow fan vanes which do not meet the conditions of the invention.
Figure 17:
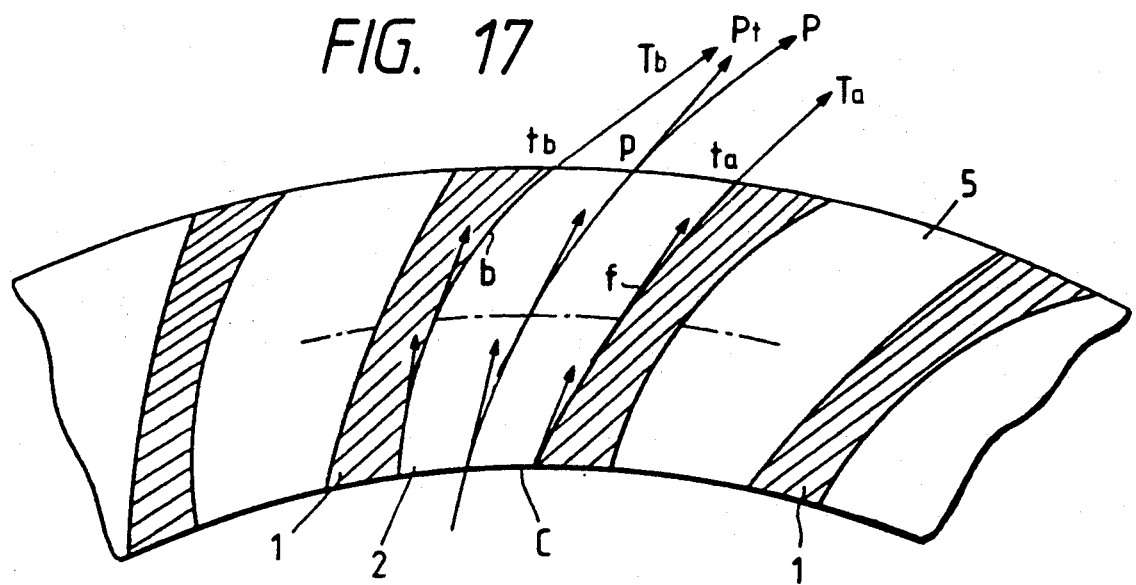

FIGS. 16 and 17 show cross-flow fans including vanes 1. The vanes 1 shown in FIGS. 16 and 17 are not shaped to meet Condition II or III described above. The vanes 1 thus constructed would not allow gap-forming molds to be withdrawn from the gaps 2 in the radially outward direction indicated by the arrow R.

More specifically, in FIG. 16, a tangential direction Ta at an inner end of the face f is directed, in the radially outward direction R, toward a tangential direction Pt on the path P at a corresponding point p. The configuration of FIG. 16 does not meet Condition II.

In FIG. 17, a tangential direction Tb at an outer end of the back b is directed, in the radially outward direction R, toward a tangential direction Pt on the path P at a corresponding point p The configuration of FIG. 17 does not meet Condition III.

Figure 18:
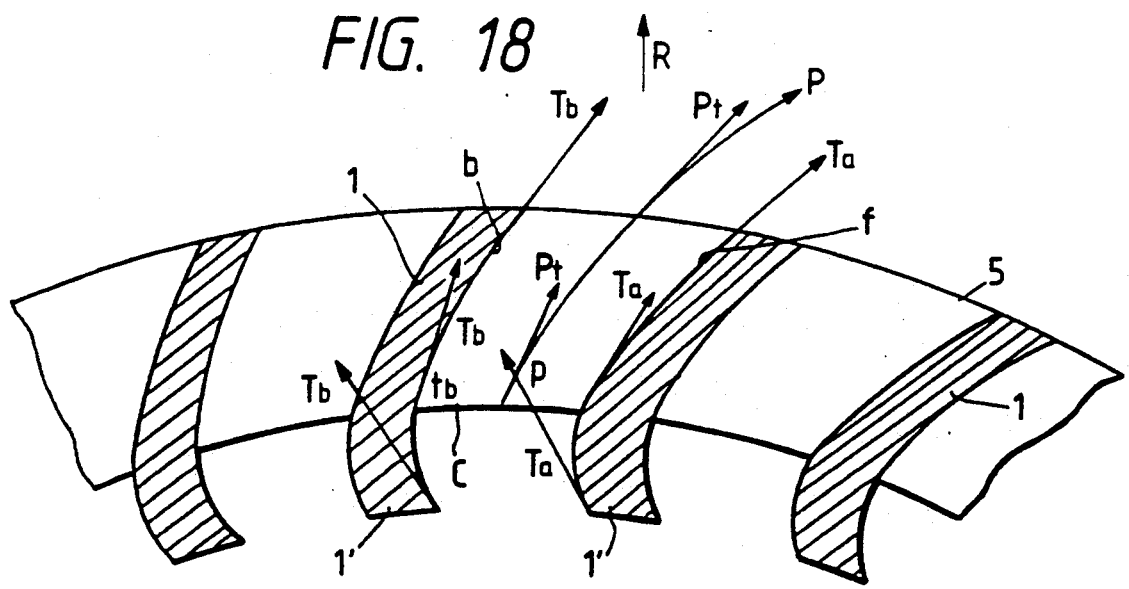
FIG. 18 is an enlarged fragmentary cross-sectional view of cross-flow fan vanes which meet the conditions of the invention.
Figure 19:
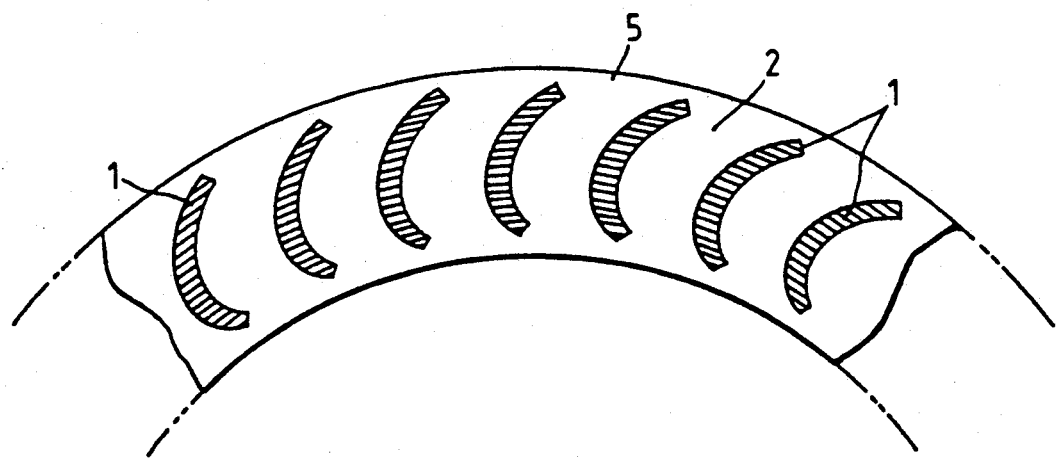
FIG. 19 is an enlarged fragmentary cross-sectional view of conventional cross-flow fan vanes.

FIG. 18 shows vanes of an integrally molded cross-flow fan according to another embodiment of the present invention.

In FIG. 18, the vanes 1 have undercut portions 1' at the inner ends of the face f and back b thereof. The undercut portions 1' themselves do not meet Conditions II and III. However, the undercut portions 1' are positioned radially inwardly of the boundary surface C between the gap-forming molds 3 and the core 4, and the remaining portions of the vanes 1 meet Conditions I, II, and III.

During the molding process, the gap-forming molds 3 are disposed between the vanes 1 down to the boundary surface C. The core 4 has mold cavities for forming the undercut portions 1'. After the cross-flow fan is molded, the gap-forming molds 3 are withdrawn radially outwardly in the direction R, and the core 4 is withdrawn in the axial direction thereof which is indicated by the arrow Q in FIG. 1.

Although certain preferred embodiments have been shown and described, it should be understood that many changes and modifications may be made therein without departing from the scope of the appended claims.

What is claimed is:

1. A method of molding a cross-flow fan having a circular array of angularly spaced, radial vanes, comprising the steps of:
    arranging a first group of a plurality of gap-forming molds angularly spaced from one another in an annular manner;
    arranging a second group of a plurality of gap-forming molds angularly spaced from one another in an annular manner, said plurality of molds of said first group being individually alternatingly disposed with respect to said plurality of molds of said second group of having gaps therebetween so as to jointly define mold cavities for forming the vanes;
    supplying a molding material into said mold cavities to mold the cross-flow fan; and
    thereafter withdrawing said first group of gap-forming molds radially outwardly from between the molded vanes, and after elapse of a period of time, withdrawing said second group of gap-forming molds, which alternate with the gap-forming molds of the first group, radially outwardly from between the molded vanes.

2. A method according to claim 1, wherein the gap-forming molds of said first group are simultaneously withdrawn radially outwardly, and after elapse of said period of time, the gap-forming molds of said second group are simultaneously withdrawn radially outwardly.

* * * * *